(12) United States Patent
Van Eindhoven

(10) Patent No.: US 12,023,746 B2
(45) Date of Patent: Jul. 2, 2024

(54) FORCIBLE ENTRY TOOL

(71) Applicant: HOLMATRO B.V., Raamsdonksveer (NL)

(72) Inventor: René Wilhelmus Johannes Van Eindhoven, Oisterwijk (NL)

(73) Assignee: HOLMATRO B.V., Raamsdonksveer (NL)

( * ) Notice: Subject to any disclaimer, the term of this patent is extended or adjusted under 35 U.S.C. 154(b) by 306 days.

(21) Appl. No.: 17/600,308

(22) PCT Filed: May 1, 2020

(86) PCT No.: PCT/NL2020/050278
§ 371 (c)(1),
(2) Date: Sep. 30, 2021

(87) PCT Pub. No.: WO2020/222649
PCT Pub. Date: Nov. 5, 2020

(65) Prior Publication Data
US 2022/0161337 A1   May 26, 2022

(30) Foreign Application Priority Data

May 2, 2019   (NL) ...................................... 2023050
Aug. 13, 2019   (NL) ...................................... 2023636

(51) Int. Cl.
  *B23D 17/06*   (2006.01)
  *A62B 3/00*   (2006.01)
  *B23D 29/02*   (2006.01)

(52) U.S. Cl.
  CPC .............. *B23D 17/06* (2013.01); *A62B 3/005* (2013.01); *B23D 29/023* (2013.01)

(58) Field of Classification Search
  CPC ...... B23D 17/06; B23D 29/023; B23D 29/02; A62B 3/005; B25F 1/003; Y10T 29/53683
  (Continued)

(56) References Cited

U.S. PATENT DOCUMENTS

| | | | |
|---|---|---|---|
| 4,392,263 A | 7/1983 | Amoroso | |
| 5,048,795 A | 9/1991 | Vitale | |
| 8,800,343 B2 * | 8/2014 | Wettlaufer | ............ A62B 3/005 72/392 |

FOREIGN PATENT DOCUMENTS

| | | |
|---|---|---|
| CN | 102581819 A | 7/2012 |
| CN | 105305330 A | 2/2016 |
| GB | 2254580 A | 10/1992 |

OTHER PUBLICATIONS

Fig. 3-A of Wettlaufer et al. U.S. Pat. No. 8,800,343 B2 (Aug. 12, 2014); retrieved from https://www.altair.de/industrial-design/usaf-extrication-tool/ ( 2014).*

(Continued)

*Primary Examiner* — Lee D Wilson
*Assistant Examiner* — Christopher Soto
(74) *Attorney, Agent, or Firm* — KDW Firm PLLC

(57) ABSTRACT

A forcible entry tool includes at least a cutter and a spreader. The forcible entry tool further includes a first tool portion having a first cutter part and a first spreader part. The forcible entry tool further includes a second tool portion having a second cutter part and a second spreader part. The first tool portion and the second tool portion are rotatable relative to one another to apply force to either or both of the cutter and the spreader.

18 Claims, 5 Drawing Sheets

(58) Field of Classification Search
USPC .................................... 29/239; 254/104, 93
See application file for complete search history.

(56) References Cited

OTHER PUBLICATIONS

International Search Report and Written Opinion for the International Patent Application No. PCT/NL2020/050278, dated Jul. 14, 2020, 13 pages.

* cited by examiner

FORCIBLE ENTRY TOOL

The present invention relates to a forcible entry tool, in particular to a forcible entry tool with which at least one of a cutting action and a spreading or plying action can be performed.

Forcible entry tools are used to gain forced entry to an otherwise locked or closed-off environment or object by forcing open a door, window or hatch of a building, vehicle, container, etc. and are commonly used by law enforcement, military, firefighting and customs agencies.

Depending on the obstacle to be overcome or entry to be gained, gaining forced entry may involve cutting through a lock, chain or cable and/or forcing two surfaces away from one another to for example open a door, so that access may be gained. As such, it is often necessary to employ a plurality of different tools in succession, each of which is typically quite bulky and heavy to be able to deliver and withstand the considerable forces that are involved.

In contrast, U.S. Pat. No. 4,392,263 discloses as prior art a reportedly "portable rescue tool" capable of cutting objects between jaw members which define an inner cutter between the jaw members and a spreader at ends of the jaw members remote from a drive cylinder. The cutter may cut an object, when the drive cylinder forces the jaw members to close, and the spreader may clear a space or passage, when the drive cylinder forces the jaw members to open. This therefore requires a bi-directionally acting drive, contributing to complexity of the known tool to an extent, where the property of the tool being portable is hampered, or at least the tool cannot be very quickly deployed, which is a considerable disadvantage. In particular when a hydraulic cylinder is employed, the bi-directionality of the force to be generated requires an intricate, complex directional control valve. The tool of this prior art disclosure requires a bi-directional motor, reservoir for hydraulic fluid and a pump to be externally provided, with fluid lines extending from a power unit comprising motor/pump to the actual tool. Both the tool and the external unit with the motor and the pump need to be set-up and connected in a time consuming manner, while quick deployment and reliability are of the utmost importance for rescue tools. Complexity aggravating switching valves are required, to set the tool for a desired operation of either cutting or spreading.

Furthermore, in particular in the fields of law enforcement, military and firefighting, it is often desirable to gain forced entry in a manner that is both reliable and time efficient.

It is an objective of the present disclosure to provide an improved forcible entry tool that at least abates some of the drawbacks of existing forcible entry tools, yielding a lighter and better maneuverable configuration.

This objective is achieved with a forcible entry tool in accordance with a general aspect of the present invention, which comprises at least a cutter and a spreader. Said forcible entry tool furthermore comprises a first tool portion comprising a first cutter part and a first spreader part; and a second tool portion comprising a second cutter part and a second spreader part, wherein the first tool portion and the second tool portion are rotatable relative to one another to apply force to either or both of the cutter and the spreader.

In a preferred embodiment, the tool may comprise a drive that is preferable rigidly connected to at least one of the first tool portion and the second tool portion. In stark contrast with U.S. Pat. No. 4,392,263, the drive may be integrated in the forcible entry tool, facilitating quick deployment of the forcible entry tool. Regardless of whether the drive involves hydraulics or mechanics, in a preferred embodiment, the forcible entry tool may exhibit the feature that the drive, cutter and spreader are configured to apply force to both of the cutter and the spreader in one rotational direction of the first and second tool parts. As a consequence, the drive may be considerably simplified relative to U.S. Pat. No. 4,392,263, in that only a rotational movement in a single direction needs to be powered to allow both the spreader and the cutter to be activated simultaneously. The drive may comprises a hydraulic fluid reservoir, a hydraulic pump connected to the reservoir, and an actuator cylinder connected to the pump and to the at least one of the first tool portion and the second tool portion. In U.S. Pat. No. 4,392,263 the drive has a motor, a pump and a reservoir, all remote from the actual tool with fluid lines running into the tool. In an embodiment in which the drive comprises a pump and a manually operable pump lever, which is reciprocally moveable between two outmost positions for actuating the pump, a motor may be omitted, and the lever then allows a cylinder to be extended to provide power/force to the tool portions.

In another preferred embodiment, the forcible entry tool may exhibit a feature that the first spreader part and the second spreader part comprise a tapered and/or flattened shape, to facilitate insertion of the spreader between objects or object parts.

In another preferred embodiment, the forcible entry tool may exhibit a feature that at least one of the first cutter part, and the second cutter part comprises a cutter face.

In another preferred embodiment, the forcible entry tool may exhibit a feature of a striking face, arranged on at least one of the first and second tool portions opposite the spreader, relative to a pivot between the first and second tool portions about which the first and second tool portions are rotatable relative to one another, A striking face could in principle be known for a spreader, such as one known from prior art publication U.S. Pat. No. 5,048,795, but due to the presence of the fluid lines according to U.S. Pat. No. 4,392,263 on a side opposite the jaw member relative to a pivot, a striking face at the defined position in U.S. Pat. No. 4,392,263 cannot be implemented in a straightforward manner.

In another preferred embodiment, the forcible entry tool may exhibit a feature of a handle. In an embodiment with an integrated drive comprising at least a hydraulic reservoir and the handle, the handle may conveniently accommodate the reservoir, when integrated in the handle, to have a sufficient storage capacity for hydraulic fluid to drive the cylinder.

In a preferred embodiment with the pump and manually operable pump lever and the handle, the forcible entry tool may exhibit a feature that the manually operable pump lever is aligned with the handle in one of the two outmost positions. Thus, when the lever is unused, the tool may have a compact size, e.g. for storage.

The handle may be fixed to one of the first and second tool portions, while the other of the first and second tool portions is rotatable relative to the one of the second and first tool portions and the handle, Apart from the self-evident simplification that is achieved hereby, as a consequence also only one of the tool portions needs to be rotated by the drive, relative to the other, whereas U.S. Pat. No. 4,392,263 has a drive and a transmission to set both jaw members in motion. This aspect of the present disclosure allows for the tool to be formed in the shape of a crow bar and used in a manner comparable therewith, for instance when the drive malfunctions unexpectedly, whereas such a method of operation would cause excessive damage to at least the transmission linkage extending between the cylinder and jaw members of U.S. Pat. No. 4,392,263. The handle may be arranged essentially perpendicular to an orientation between the cutter and the spreader, precisely for resembling the shape and function of a crow bar, allowing a user to wreck the tool whereas a carrying handle bar according to U.S. Pat. No. 4,392,263 is only suitable or configured for carrying the known tool. The handle may comprise an additional tool from a group of tools, said group comprising a wedge, a nail puller and a prier, adding to versatility of the tool with respect to applicability thereof. This is further enhanced, when the additional tool is fastened to the handle in an exchangeable manner, so that a selection of add-on tools may be arranged on the handle.

With much preference, the cutter may be defined and arranged on an outside of the first and second tool portions for short range accessibility to an external device to be cut, such as a pad lock. In contrast with the known tool according to U.S. Pat. No. 4,392,263, which has a cutter defined in the interior of (i.e. between) the jaw members, the provision of the cutter along the outer circumference of the tool portions allows the cutter to be provided at any desired location, allowing more freedom in the design of the tool, as well as a compact arrangement of the cutter and tool to leave more space for additional functionalities, such the one provided by a striking face or the like.

A forcible entry tool in accordance with the present invention may exhibit a multitude of preferred embodiments, some of which may be disclosed in the below description and/or may be conceived by a skilled person after having taken note of the present disclosure.

Herein above, a general concept of a forcible entry tool in accordance with the present invention is referred to on the basis of relatively generic indications of the features thereof, which correspond to the definitions in the appended independent claim. Herein below, preferred exemplary embodiments of the present invention are elucidated with reference to the appended drawing. It is emphasised here that these embodiments are merely of an exemplary nature and that the same or similar functionalities may be achieved with the basic principles of the present invention.

Throughout the below description of the exemplary embodiments of the present invention, identical or similar entities, components, functional units or concepts and the like may be referred to using the same or identical reference signs when referring to the appended drawing, in which.

Figure 4A:
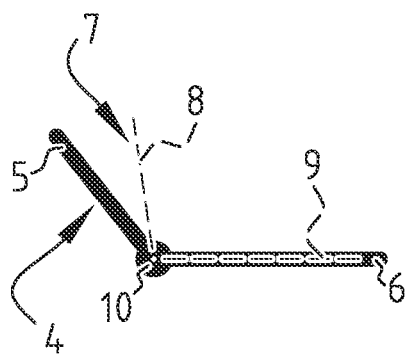
Figure 4B:
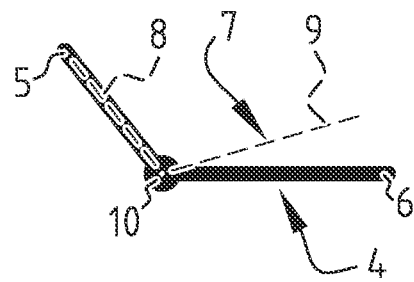
Figure 5A:
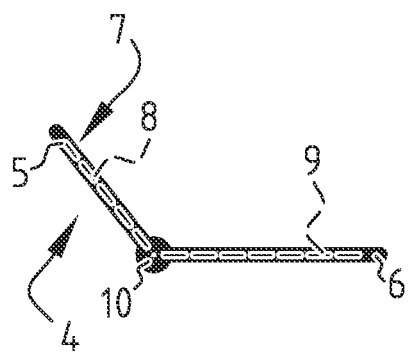
Figure 5B:
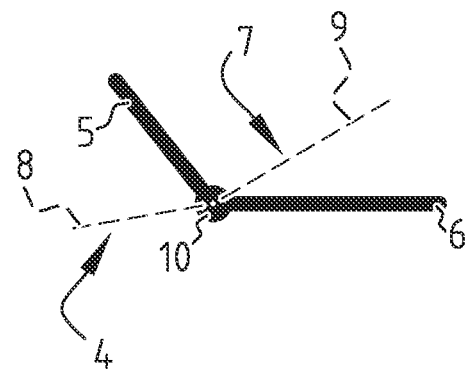
Figure 6A:
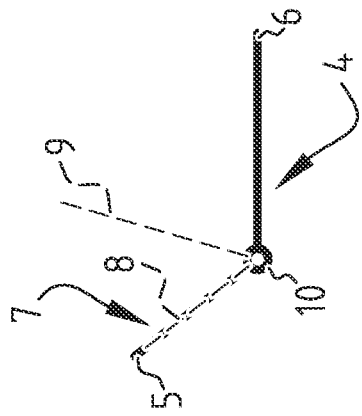
Figure 7A:
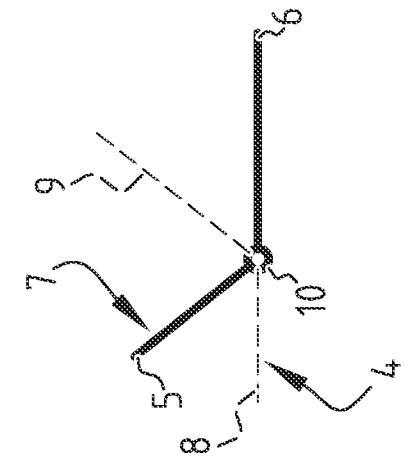
Figure 6B:
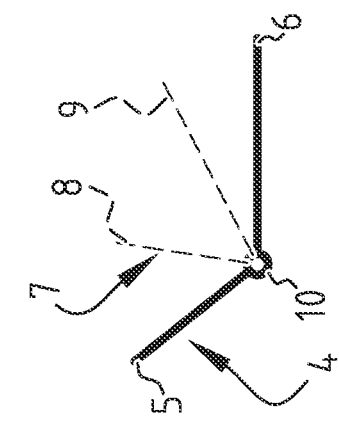
Figure 7B:
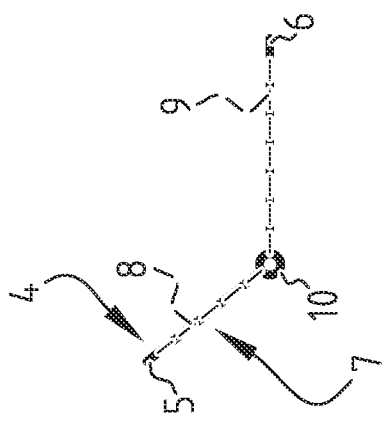
Figure 6C:
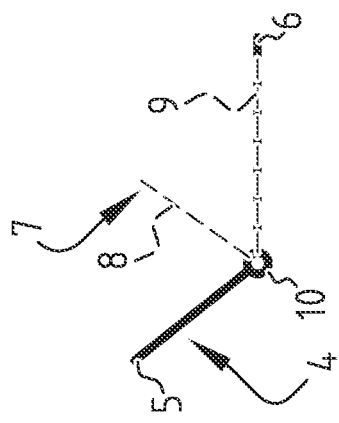
Figure 7C:
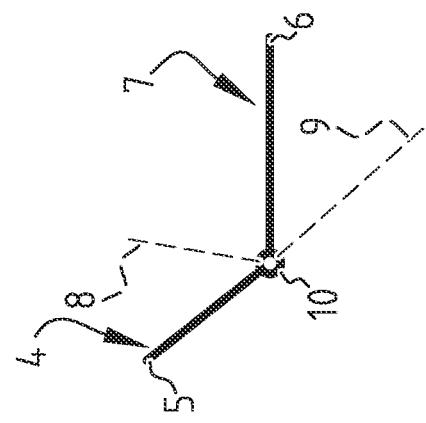

FIGS. 4A and 4B schematically depict a first configuration of first and second tool parts respectively comprising a first cutter part, a first spreader part and a second cutter part and a second spreader part in different states of the forcible entry tool;

FIGS. 5A and 5B schematically depict an alternative configuration of the first and second tool parts in different states of the forcible entry tool;

FIG. 6A-C schematically depict a further alternative configuration of the first and second tool parts in different states of the forcible entry tool; and FIG. 7A-C schematically depict yet a further alternative configuration of the first and second tool parts in different states of the forcible entry tool.

Figure 1:
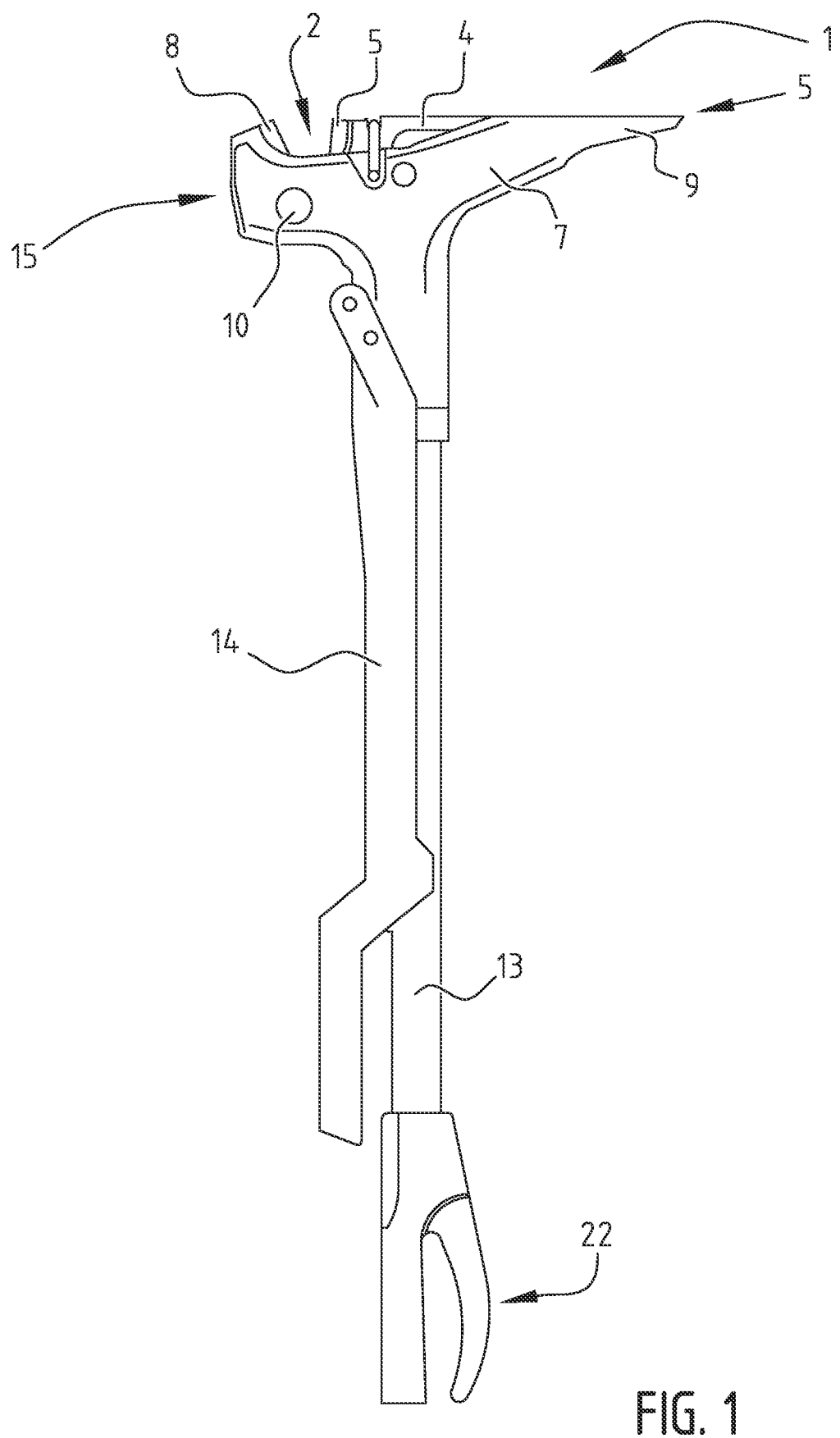
FIG. 1 shows a perspective of an exterior of a forcible entry tool in accordance with an exemplary embodiment of the present invention.
Figure 2:
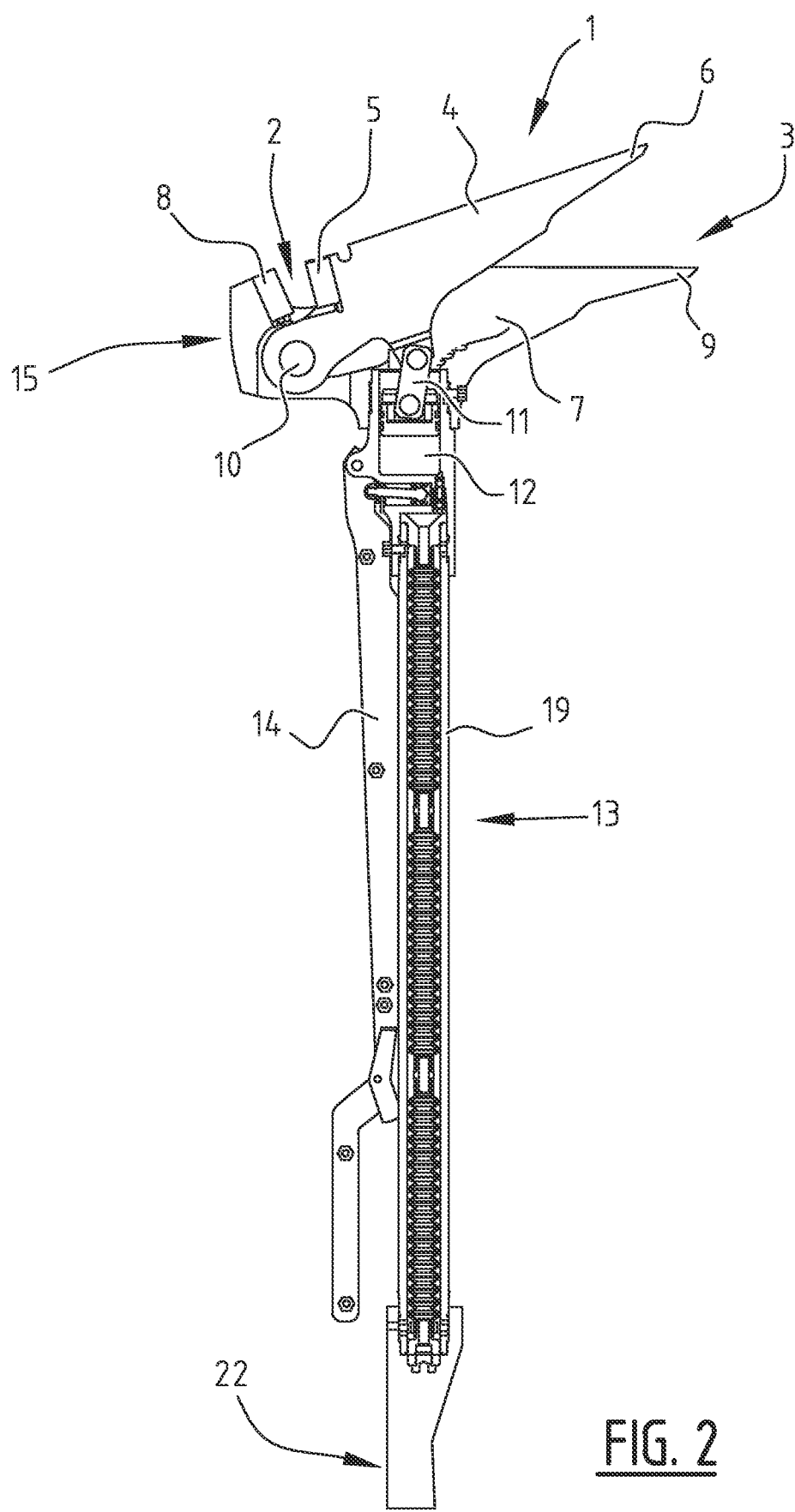
FIG. 2 shows a cross sectional view of the forcible entry tool of FIG. 1.

FIGS. 1 and 2 show a forcible entry tool 1 comprising a cutter 2 and a spreader 3. As is best illustrated in FIG. 2, the forcible entry tool 1 comprises at least a first tool portion 4 and a second tool portion 7 that are arranged adjacent to one another and are configured to rotate relative to one another by means of a pivot 10.

As is furthermore shown in FIG. 1, the first tool portion 4 and the second tool portion 7 respectively comprise a first cutter part 5 and a second cutter part 8, each arranged at ends of the respective tool portions 4, 7. One or both of first cutter part 5 and second cutter part 8 preferably comprise a sharpened cutter face configured to be able to cut through cables, chains, bars or lock components upon a relative rotation of tool portions 4, 7 in a first rotational direction, wherein one or both of first and second cutter parts 5, 8 traverses towards the other, thereby performing a cutting action. The first cutter part 5 and the second cutter part 8 may thus collectively constitute cutter 2.

First tool portion 4 and second tool portion 7 furthermore respectively comprise a first spreader part 6 and a second spreader part 9, which are arranged at other ends of their respective tool portions 4, 7. First spreader part 6 and second spreader part 9 may collectively constitute spreader 3. Upon a relative rotation of tool portions 4, 7 by means of pivot 10 in the first rotational direction, one or both of first and second spreader may traverse away from the other, thereby performing a spreading action.

Figure 3:
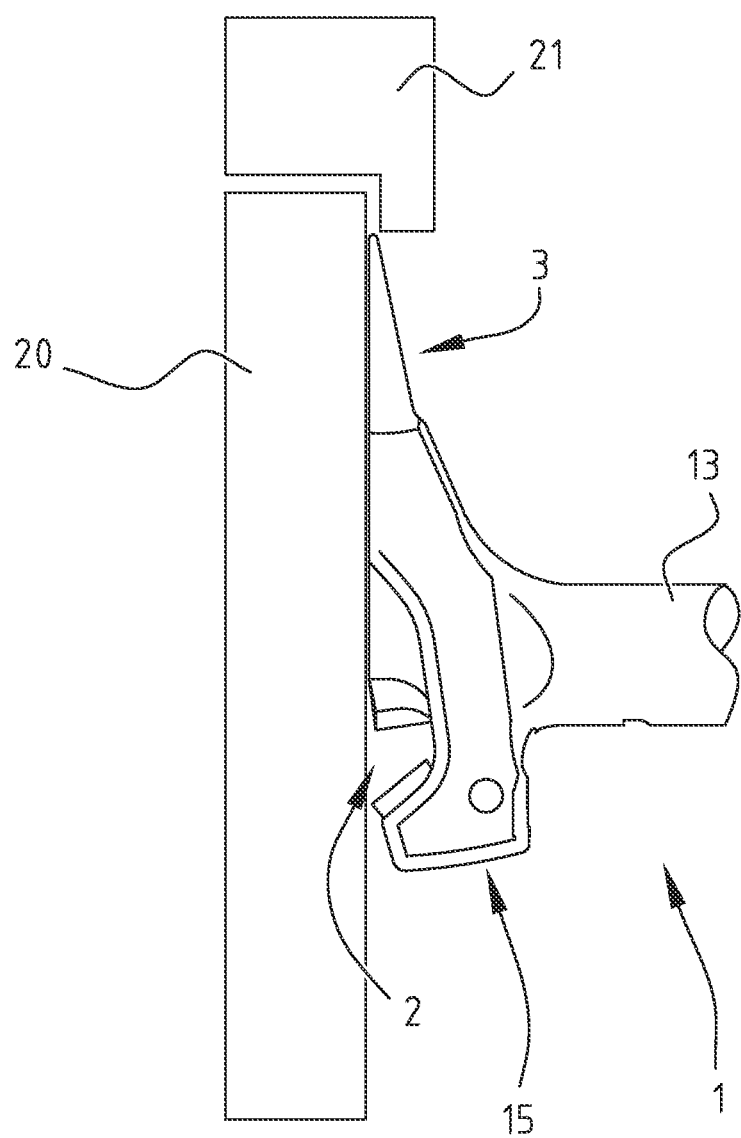
FIG. 3 elucidates a spreading action performed with the forcible entry tool depicted in FIG. 1 and FIG. 2

In preferred embodiments of the present invention, first spreader part 6 and second spreader part 9 furthermore each exhibit shapes that are tapered and flattened in at least one rotational direction, so that spreader 3 may be forced into a slit or groove prior to a spreading action of first and second spreader parts 6, 9, as is illustrated in FIG. 3, where a door 20 and a door frame 21 are shown, for the spreader 3 to be pried there between and activated for the door 20 to be forced open from door frame 21.

Still referring to FIG. 3, a spreading action may be performed with forcible entry tool 1 by first forcing spreader 3 into a slit or groove adjacent to a door 20, or alternatively a window or hatch to be opened. In order to force spreader 3 into said slit or groove, forcible entry tool 1 may furthermore comprise a striking face 15 arranged at a distal end of forcible entry tool 1 substantially opposite of spreader 3. Said striking face 15 may be struck, for example with a hammer, to force spreader 3 into the slit or groove. After spreader 3 has been arranged within the slit or groove, the spreading action itself may be subsequently performed as described herein above and below.

By means of striking face 15, forcible entry tool may also be used as a hammer to for example break a window. Striking face 15 may thus advantageously add a further function to forcible entry tool 1.

In the exemplary embodiment described thus far, forcible entry tool 1 may perform both a cutting action and spreading action by a relative rotation of tool portions 4, 7 in a single first rotational direction. To this end, forcible entry tool 1 furthermore comprises an actuator 11 embodied by a push rod 11 to rotate at least one of tool portions 4, 7 relative to the other about the pivot 10 in said first rotational direction.

In the embodiment depicted in FIG. 2, push rod 11 is connected to a piston rod of a piston in a cylinder 12. The forcible entry tool 1 furthermore comprises a lever 14 disposed near a handle 13 which extends in a longitudinal direction from at least one of first tool portion 4 and second tool portion 7.

Lever 14 may be arranged on the same pivot 10, defined by for example a rotation axis, as tool portions 4, 7, for further simplification of the forcible entry tool 1.

Handle 13 is preferably arranged perpendicular to an orientation between cutter 2 with striking surface 15 and spreader 3, so that it extends away from the object to be opened, which creates more operational space for the tools operator. Additionally, it leaves more space for striking surface 15 to be struck by, for instance, a hammer.

Handle 13 may have, at a distal end thereof, opposite the spreader 3 and cutter 2, an additional tool 22. Additional tool 22 may be a tool from a group of tools, said group at least comprising a nail puller, a wedge and prier to force a relatively small opening, for example between a door of a car wreck and the rest of the car, to allow a larger and potentially motor driven spreader to extend the initiated opening, adding a further function to the forcible entry tool 1, Additional tool 22 may be fastened to the handle 13 in an exchangeable manner, to selectively attach, for example, a nail puller or exchange the nail puller with the shown prier 22.

Located within handle 13 a reservoir 19 is provided, comprising preferably a hydraulic fluid, such as oil. Upon reciprocal manipulation of lever 14, said fluid may be pumped into an interior of cylinder 12, thereby forcing the piston located therein outward. Pumping transfer of hydraulic fluid from reservoir 19 to cylinder 12 may be achieved with a commonly known pump configuration, for example involving a chamber with a piston arranged therein, with the piston connected to lever 14, to force fluid from the chamber and into the cylinder 12 via a channel comprising a check or non-return valve. Preferably the check or non-return valve is then externally operable to allow a flow of liquid from cylinder 12 back to reservoir 19. Push rod 11, which is rotatably connected to said piston rod and to one of first and second tool portions 4, 7, may then convey said outward motion of the piston to said at least one of first and second tool portions 4, 7, therewith causing rotation of at least one of tool portions 4, 7 relative to the other in the first rotational direction.

The above described embodiments of forcible entry tool 1 are based on a manually operated, hydraulically based, jack-like drive system comprising actuator 11, cylinder 12, lever 14 and reservoir 19 to rotate one of first and second tool portions 4, 7 relative to the other, thereby performing at least one of the cutting action and the spreading action. The present disclosure is, however, not limited to these embodiments; it being conceivable that forcible entry tool 1 is instead based on a pneumatically based, manually operated, jack-like drive system; or a drive system comprising a leadscrew. Further alternative embodiments may even comprise an electrically based drive system comprising an electric motor with for example batteries in the handle 13, or any combination of the aforementioned techniques.

Due to the above described configuration of pivot 10; first tool portion 4 comprising first cutter part 5 and first spreader part 6; and second tool portion 7 comprising second cutter part 8 and second spreader part 9, it is advantageously made possible to perform both the cutting action and the spreading action by means of a relative rotation of tool portions 4, 7 in a single first rotational direction. Consequently, the construction of forcible entry tool 1 may comprise a cylinder 12 to be single acting, i.e. to forcibly extend in a single direction, and thus be kept relatively simple and robust, without any need for means to exert a force for a relative rotation of tool portions 4, 7 in a further second rotational direction.

The above notwithstanding, it is noted here that many alternative embodiments of a forcible entry tool 1 in accordance with the present invention may be conceived, in particular concerning advantageous arrangements of the cutter part 5, the first spreader part 6, the second cutter part 8 and the second spreader part 9 relative to the respective first and second tool portions 4, 7. Herein below, such alternative arrangements will be referred to as configurations.

FIG. 4A schematically depicts an embodiment of a forcible entry tool 1 with a configuration corresponding to a configuration of the embodiment shown in FIGS. 1-3.

In FIGS. 4A to 7C, first tool portion 4 is represented by the bold solid lines connected to pivot 10, whereas second tool portion 7 is represented by the dashed lines connected to pivot 10.

In an initial state depicted in FIG. 4A, first and second cutter parts 5, 8 are located at a distance to one another, while first and second spreader parts 6, 9 are located adjacent to one another. In this initial state, forcible entry tool 1 may thus be used to perform either one of a cutting action and a spreading action through a relative rotation of first and second tool portions 4, 7 in a first rotational direction. In FIGS. 4A and 4B, said relative rotation is may be imagined as a clockwise rotation of second tool portion 7. After having completed the cutting or spreading action, forcible entry tool 1 will have been brought into a subsequent state, which is depicted in FIG. 49, In this subsequent state, first and second cutter parts 5, 8 are located adjacent to one another, while first and second spreader parts 6, 9 are located at a distance to one another. In this embodiment and in this state, forcible entry tool 1 therefore requires to first be brought back into the initial state of FIG. 4A before a subsequent cutting action or spreading action can be performed.

FIG. 5A schematically depicts an alternative configuration in a first state, in which first and second spreader parts 6, 9 are located adjacent to one another; with first and second cutter parts 5, 8 likewise being located adjacent to one another. In this first state, forcible entry tool 1 may only be used to perform a spreading action, wherein first and second spreader parts 6, 9 traverse away from one another during a relative rotation of first and second tool portions 4, 7 in a first rotational direction, during which first and second cutter parts 5, 8 likewise traverse away from one another. Going from FIG. 5A to FIG. 5B, said relative rotation may be imagined as a counter-clockwise relative rotation of second tool portion 7. After completion of said spreading action, forcible entry tool 1 will be in a second state as depicted in FIG. 5B, wherein first and second cutter parts 5, 8 are located at a distance from one another; therefore being ready to perform a cutting action through a relative rotation of first and second tool portions 4, 7 in a second rotational direction. Said relative rotation of first and second tool portions 4, 7 in a second rotational direction may be imagined as a clockwise rotation of second tool portion 7 when going from the second state depicted in FIG. 5B back to the first state depicted in FIG. 5A.

The embodiment of forcible entry tool 1 depicted in FIG. 5A-B is considered to be advantageous in situations wherein a spreading action is to be followed by a cutting action, or vice versa, in quick succession, as the spreader 3 may be brought in a flat state of FIG. 5A as the cutter 2 completes a cutting operation.

FIG. 6A depicts a further alternative configuration of first and second cutter parts 5, 8 and first and second spreader parts 6, 9 in a first state of forcible entry tool 1. In this first state, first and second spreader portions 6, 9 are located adjacent to one another while the first and second cutter parts 5, 8 are located at a distance to one another. In this first state, spreader 3 is in a flat state in which it is capable of performing a spreading action through a relative rotation of first and second tool parts, 4, 7 in a first rotational direction, during which first and second spreader portions 6, 9 traverse away from one another. In the figures associated with this embodiment, said first rotational direction may be thought of as a counter-clockwise rotational direction of second tool portion 7 when forcible entry tool 1 transitions from the first state depicted in FIG. 6A to the second state depicted in FIG. 6B.

After completion of the aforementioned spreading action, the forcible entry tool 1 in accordance with the present embodiment will be in a second state, which is depicted in FIG. 6B. In this second state, first and second spreader portions 6, 9 are located at a distance from one another, as are first and second cutter parts 5, 8; it being possible to perform a subsequent cutting action in which first and second cutter parts 5, 8 further traverse towards one another through a relative rotation of first and second tool portions 4, 7. Said relative rotation may be though of as a counter-clockwise rotation of second tool portion 7 when forcible entry tool 1 transitions from the second state depicted in FIG. 6B to the third state depicted in FIG. 6C.

The embodiment of forcible entry tool 1 exhibiting the configuration shown in FIG. 6A-C comprises the advantage that a spreading action may be quickly followed by a subsequent cutting action, with both actions being performed by relative rotations of first and second tool portions 4, 7 in a same rotational direction. Consequently, a relatively simple design of forcible entry tool 1 can be retained.

In accordance with the embodiments of forcible entry tool 1 depicted in FIGS. 1-6, first and second cutter parts 5, 8 may have their respective cutter parts 5, 8 arranged so that when performing a cutting action, the respective cutter parts 5, 8 collide with one another. However, in the embodiment of forcible entry tool 1 depicted in FIGS. 7A-C, the two respective cutter parts 5, 8 are displaced relative to one another in a longitudinal direction of pivot 10, so that and second cutter parts 5, 8 may traverse past one another.

FIG. 7A depicts yet a further alternative configuration of first and second cutter parts 5, 8 and first and second spreader parts 6, 9 in a first state of forcible entry tool 1. In this first state; first and second cutter parts 5, 8 and first and second spreader parts 8, 9 are located at a distance to one another, respectively, the forcible entry tool 1 thus being capable of performing a cutting action in said state.

When such a cutting action is performed, first and second tool parts 4, 7 will undergo a rotation relative to one another in a first rotational direction, until the forcible entry tool 1 is brought into a second state depicted in FIG. 7B. With reference to FIGS. 7A and 7B, said relative rotation may be thought of as a counter-clockwise rotation of second tool part 7.

Upon having been brought into the second state, first and second cutter parts 5, 8 and first and second spreader parts 8, 9 are located adjacent to one another, respectively. As such, forcible entry tool 1 may perform a spreading action when in this second state, said spreading action comprising a further relative rotation of first and second tool parts 4, 7 relative to one another in the first rotational direction, after which the forcible entry tool 1 will have been brought into a third state depicted in FIG. 7C. The aforementioned relative rotation of first and second tool parts 4, 7 may be thought of as second tool portion 7 undergoing a counter-clockwise rotation when the forcible entry tool 1 transitions from the second state depicted in FIG. 7B to the third state depicted in FIG. 7C.

After the cutting and spreading actions have been performed with the forcible entry tool 1 in accordance with the embodiment depicted in FIGS. 7A-C, first and second cutter parts 5, 8 will have effectively traversed past one another. As such, it is considered essential in this embodiment that first and second cutter parts 5, 8 are dimensioned and/or arranged to do so. In contrast, the first and second cutter parts 5, 8 of a forcible entry tool depicted in the embodiments of FIGS. 1-6 may be alternatively be configured to collide with one another upon completion of a cutting action.

In the embodiment depicted in FIGS. 7A-C, a cutting action a may be performed by a relative rotation of first and second tool portions 4, 7 in a single first rotational direction, quickly followed by a spreading action by a relative rotation of first and second tool portions 4, 7 in the same first rotational direction. As such, a forcible entry tool 11 is provided with which cutting and spreading actions may be performed in quick succession; and of which the construction may likewise retain a degree of relative simplicity. In particular, such embodiments may comprise the cylinder 12 to be single acting, i.e. to forcibly extend in the single rotational direction.

It is to be noted here that the different embodiments or configurations depicted in particular in FIGS. 4A-7C are merely of an exemplary nature; it being entirely conceivable that the skilled person may envision even further alternative configurations or embodiments without departing from the inventive concept of the present disclosure. Consequently, the different embodiments and configurations of FIGS. 4A-7C should not be understood to in any way limit the scope of the present disclosure or the claimed subject-matter, the scope of the latter being solely defined by the appended independent claims.

In certain embodiments of the present invention, forcible entry tool 1 may, comprise an additional drive system in addition to the drive system comprising actuator 11, cylinder 12, lever 14 and reservoir 19, so that forcible entry tool 1 may apply a rotational force in both first and second rotational directions. Alternatively, it is conceivable that actuator 11 is configured to selectively convey said rotational force in either one of the first and second rotational directions, thereby eliminating the need for such an additional drive system.

It is noted here that the scope of protection for the developments described in the present disclosure are by no means limited to any particular feature of the embodiments described above and illustrated in the appended drawing. The scope of protection is exclusively determined based on the limitations of the appended independent claims, but may, in some jurisdictions, even encompass obvious alternatives for features in the independent claims. For example, a pneumatic drive may be possible. Other variations for specifically described elements, components and functionalities, that may also be embodied within the scope of the appended claims of the present disclosure, have been at least hinted at in the above embodiment description or the skilled person may be considered to be able to contemplate these variations within the range of this skilled person's general knowledge. This exemplary reference to alternative embodiments substantiates that any limitation to any specific feature that is not defined as a limitation in the independent claims is unwarranted.

The invention claimed is:

1. A forcible entry tool comprising at least a cutter and a spreader, wherein the forcible entry tool comprises:
   a first tool portion comprising a first cutter part and a first spreader part;
   a second tool portion comprising a second cutter part and a second spreader part;
   wherein the first tool portion and the second tool portion are rotatable relative to one another,
   a drive rigidly connected to at least one of the first tool portion and the second tool portion, wherein the drive is configured to apply force to both the cutter and the spreader in one rotational direction of the first and second tool parts; and
   a striking face, arranged substantially opposite the spreader, relative to a pivot between the first and second tool portions about which the first and second tool portions are rotatable relative to one another.

2. The forcible entry tool according to claim 1, wherein the drive is integrated in the forcible entry tool.

3. The forcible entry tool according to claim 1, wherein the drive comprises a hydraulic fluid reservoir, a hydraulic pump connected to the reservoir, and an actuator cylinder connected to the pump and to the at least one of the first tool portion and the second tool portion.

4. The forcible entry tool according to claim 1, wherein the drive comprises a pump and a manually operable pump lever, which is reciprocally moveable between two outmost positions for actuating the pump.

5. The forcible entry tool according to claim 1, wherein the first spreader part and the second spreader part comprise a tapered and/or flattened shape.

6. The forcible entry tool according to claim 1, wherein at least one of the first cutter part and the second cutter part comprises a cutter face.

7. The forcible entry tool according to claim 1, further comprising a handle.

8. The forcible entry tool according to claim 7, wherein the drive comprises a hydraulic fluid reservoir, a hydraulic pump connected to the reservoir, and an actuator cylinder connected to the pump and to the at least one of the first tool portion and the second tool portion, and wherein at least the hydraulic fluid reservoir is integrated into the handle.

9. The forcible entry tool according to claim 7, wherein the drive comprises a pump and a manually operable pump lever which is reciprocally moveable between two outmost positions for actuating the pump, and wherein the manually operable pump lever is aligned with the handle in one of the two outmost positions.

10. The forcible entry tool according to claim 7, wherein the handle is fixed to one of the first and second tool portions, while the other of the first and second tool portions is rotatable relative to the one of the second and first tool portions and the handle.

11. The forcible entry tool according to claim 7, wherein the handle is arranged essentially perpendicular to an orientation between the cutter and the spreader.

12. The forcible entry tool according to claim 7, wherein the handle comprises an additional tool selected from a group of tools, said group comprising a wedge, a nail puller and a prier.

13. The forcible entry tool according to claim 12 wherein the additional tool is fastened to the handle in an exchangeable manner.

14. The forcible entry tool according to claim 1, wherein the cutter is defined and arranged on an outside of the first and second tool portions for short range accessibility to an external device to be cut.

15. The forcible entry tool according to claim 1, wherein the forcible entry tool is configured to perform both a cutting action and a spreading action by a relative rotation of the first and second tool portion in said one rotational direction.

16. A forcible entry tool comprising at least a cutter and a spreader, wherein the forcible entry tool comprises:
   a first tool portion comprising a first cutter part and a first spreader part;
   a second tool portion comprising a second cutter part and a second spreader part, wherein the first tool portion and the second tool portion are rotatable relative to one another,
   a drive rigidly connected to at least one of the first tool portion and the second tool portion, wherein the drive is configured to apply force to both the cutter and the spreader in one rotational direction of the first and second tool parts, and
   a handle, wherein the handle is fixed to one of the first and second tool portions, while the other of the first and second tool portions is rotatable relative to the one of the second and first tool portions and the handle.

17. A forcible entry tool comprising at least a cutter and a spreader, wherein the forcible entry tool comprises:
   a first tool portion comprising a first cutter part and a first spreader part;
   a second tool portion comprising a second cutter part and a second spreader part, wherein the first tool portion and the second tool portion are rotatable relative to one another,
   a drive rigidly connected to at least one of the first tool portion and the second tool portion, wherein the drive is configured to apply force to both the cutter and the spreader in one rotational direction of the first and second tool parts, and
   a handle, wherein the handle comprises an additional tool selected from a group of tools, said group comprising a wedge, a nail puller and a prier.

18. The forcible entry tool according to claim 17, wherein the additional tool is fastened to the handle in an exchangeable manner.

* * * * *